(12) United States Patent
Yuen

(10) Patent No.: US 7,024,376 B1
(45) Date of Patent: Apr. 4, 2006

(54) INTERNET-BASED AUCTION METHOD

(76) Inventor: Henry C. Yuen, 135 N. Los Robles Ave., #870, Pasadena, CA (US) 91101

( * ) Notice: Subject to any disclaimer, the term of this patent is extended or adjusted under 35 U.S.C. 154(b) by 659 days.

(21) Appl. No.: 09/607,606

(22) Filed: Jun. 30, 2000

Related U.S. Application Data

(60) Provisional application No. 60/142,128, filed on Jul. 2, 1999.

(51) Int. Cl.
*G06F 17/60* (2006.01)

(52) U.S. Cl. .................................................. 705/26

(58) Field of Classification Search .................. 705/26, 705/27, 37, 38, 80, 400; 455/4.2
See application file for complete search history.

(56) References Cited

U.S. PATENT DOCUMENTS

| | | | |
|---|---|---|---|
| 5,754,938 A * | 5/1998 | Herz et al. .................... | 455/4.2 |
| 5,890,138 A * | 3/1999 | Godin et al. .................. | 705/26 |
| 5,897,620 A | 4/1999 | Walker et al. ................. | 705/5 |
| 6,012,045 A * | 1/2000 | Barzilai et al. ............... | 705/37 |
| 6,041,326 A | 3/2000 | Amro et al. ................... | 707/10 |
| 6,044,363 A * | 3/2000 | Mori et al. .................... | 705/37 |
| 6,058,417 A | 5/2000 | Hess et al. .................... | 709/219 |
| 6,064,981 A * | 5/2000 | Barni et al. ................... | 705/26 |
| 6,076,070 A * | 6/2000 | Stack ............................ | 705/20 |
| 6,161,099 A * | 12/2000 | Harrington et al. ........... | 705/37 |
| 6,202,051 B1 * | 3/2001 | Woolston ...................... | 705/27 |
| 6,598,026 B1 * | 7/2003 | Ojha et al. .................... | 705/26 |
| 6,647,373 B1 * | 11/2003 | Carlton-Foss ................ | 705/37 |
| 2002/0184059 A1 * | 12/2002 | Offutt et al. ................... | 705/5 |

FOREIGN PATENT DOCUMENTS

JP   58161067 A   *   9/1983

OTHER PUBLICATIONS

Applegate, Jane: "Cost-Cutting Doesn't Have to Hurt"; Chicago Sun-Times (Late Sports Final Edition); Chicago IL; Nov. 24, 1993; p. 60.*
Akst, Daniel: "Personal Technology; Web Site Offers Glimpse of Net's Marketplace Possibilities"; Los Angeles Times (Home Edition); Los Angeles CA; May 13, 1996; p. 5.*
Turnis, Jane: "Shoppers who do homework get better price"; The Gazette; Colorado Springs CO; Nov. 26, 1998; p. A1.*
Manes, Stephen: "Off-Web dickering"; Forbes; New York NY; Apr. 5, 1999; v163, i7; p. 134.*

* cited by examiner

*Primary Examiner*—Jeffrey A. Smith
(74) *Attorney, Agent, or Firm*—Gifford, Krass, Groh, Sprinkle, Anderson & Citkowski, P.C.

(57) ABSTRACT

A method and system enable users to purchase goods and services at an optimal price using a reverse auction process. The preferred approach incorporates two phases: first, the process determines the most favorable advertised price for the item sought, based on a search and review of multiple vendors offering the item for sale. Second, the process negotiates a sale price lower than the most favorable advertised price by soliciting bids from multiple vendors of the item, where each bid represents an offer for sale of the item at a price lower than the most favorable advertised price. The purchaser selects a bid received from the pool of vendors, and the process generates a purchase order to the vendor corresponding to the selected bid for the item.

2 Claims, 1 Drawing Sheet

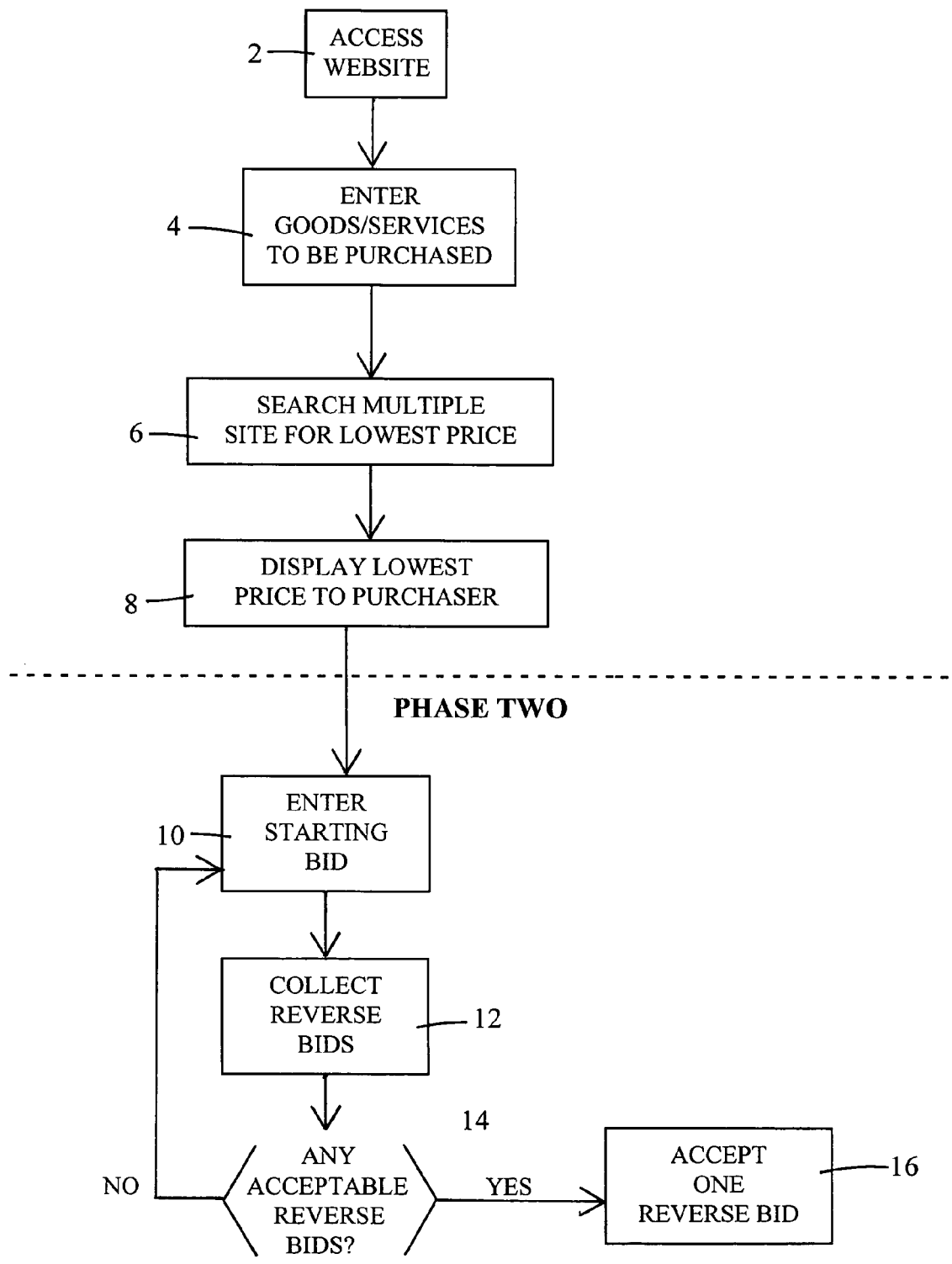

INTERNET-BASED AUCTION METHOD

REFERENCE TO RELATED APPLICATION

This application claims priority from U.S. provisional application Ser. No. 60/142,128, filed Jul. 2, 1999, the entire contents of which are incorporated herein by reference.

FIELD OF THE INVENTION

The present invention relates generally to a method and system for purchasing goods and services. More particularly, the present invention relates to a method and system that locate and purchase goods or services at an optimal price.

BACKGROUND OF THE INVENTION

The use of the Internet and World Wide Web are becoming increasingly popular for commercial transactions. There are a number of ideas, including patented inventions, which are directed to the idea of buying and selling goods and services over the Internet. In particular, there are now a number of websites that facilitate Internet shopping.

In general, there are three methods for conducting commercial transactions over the Internet: auction-based, lowest price searching, and offers to purchase.

The first method, auction-based, generally comprises a website used to arbitrate bids and generate sales through a competitive offers from multiple prospective purchasers. An example of an auction-based website may be found at www.ebay.com.

The second method, lowest price searching, involves a method whereby the purchaser utilizes a website and a search engine to traverse multiple websites searching for the lowest price for the goods or services sought to be purchased. Alternatively, there are many websites devoted to commercial transactions that list different sites to inform purchasers as to which providers are offering the best deal. Examples of lowest price searching web sites include www-.pricewatch.com and www.shopper.com.

The third method, offers to purchase, involves websites which accept offers from the prospective purchaser and either agree to sell the goods or services based on that price or reject the offer, requesting a higher price from the purchaser. An example of this type of purchasing can be seen at www.priceline.com. Descriptions of search techniques and auction methods may be found in U.S. Pat. Nos. 5,897,620; 6,041,326; and 6,058,417, the entire contents of each of which are incorporated herein by reference.

There are a number of disadvantages for the purchaser who uses the methods of the current art. The auction-based method often results in a purchase predicated on a bid from the consumer where the bid is actually higher than sales prices posted on web sites offering direct (non-auction) purchase of the same item. Additionally, the auction-based methods generally offer goods and services from a single or limited number of sources, thus limiting the purchaser's supply options. Finally, the auction-based methods result in an upward spiral of the purchase price of an item during the bidding process, thus resulting in a transaction that favors the seller, not the purchaser.

The lowest price searching method discloses an arbitrary price posted by a vendor without any ability on the part of the purchaser to negotiate a lower price. Additionally, use of this method forecloses the possibility of obtaining a more favorable price through an auction process.

The offer to purchase method restricts the purchaser to one source of items, thus excluding sources that might accept a lower offer from the purchaser. Also, a purchaser using this method does not necessarily have knowledge of posted advertised prices from other sources, and thus submits an offer higher in price than the price advertised by the other sources.

What is needed therefore is a method and system for purchasing goods and services via the Internet, wherein the purchaser obtains pricing information for an item from a broad selection of vendors offering that item; determines a lowest price from the obtained pricing information, and negotiates a final purchase price lower than the lowest price obtained in the pricing information, thus gaining the ability to purchase the item at the lowest price possible in a broad market scheme.

SUMMARY OF THE INVENTION

The present invention overcomes the deficiencies noted in the current art, and provides a method and system that spans a global market of sources for a particular item to determine a lowest price in that market. Broadly, according to the invention, the technique is used to solicit a purchase amount from the purchaser where the amount is lower than the lowest market price from the purchaser. In the preferred embodiment, the purchase amount is used to seed a bidding process among a pool of vendors, enabling a purchaser to purchase the item from the vendor submitting the lowest bid. Thus, the purchaser obtains the item at a cost significantly lower than the cost for the same item obtained using other methods; i.e., auction-base, lowest price searching, or offers to purchase.

In one embodiment, the process utilizes the Internet to conduct the reverse auction in two phases. In the first phase, the reverse auction process obtains the prices of like items from multiple sources, and determines a single, lowest price from obtained prices.

Typically, the purchaser accesses a web site associated with provider of reverse auction services (hereinafter, the reverse auction web site). The reverse auction web site includes a server, software and various computer components.

The purchaser views one or more pages on the reverse auction web site containing information regarding the reverse auction process. The purchaser then indicates to reverse auction web site server the item sought for purchase; e.g., the purchaser selects the item from a pull down menu containing a list of various items displayed on the web page.

The server associated with the reverse auction web site receives the data regarding the item to be purchased, and invokes software to search the World Wide Web for web sites offering that item for sale. For each web site located that offers the item, the software records the price at which the item is advertised for sale. The server and its associated software determine a lowest price from the pool of recorded prices, and forward the determined lowest price information to the purchaser; displays the determined lowest price on a web page viewed by the purchaser. This completes phase one.

In the second phase, the reverse auction process solicits a starting bid from the purchaser, collects bids representing offers for sale from multiple vendors, and selects a bid containing the lowest purchase price offered by a vendor from the collection of bids.

Typically, after viewing the determined lowest price generated in phase one, the purchaser posts a starting bid to the reverse auction site, wherein the starting bid includes an offer to purchase at a price lower than the lowest price determined in the previous step.

The reverse auction site, its server, and its associated software utilize the starting bid to seed the bidding process among vendors. In doing so, the software solicits offers for sale of the item, via the Internet, from vendors of the item. The offers for sale must contain a price term where the amount is as low or lower than the starting bid. These offers for sale (hereafter, reverse bids), generate a competition to sell the item among the vendors, thus driving the purchase price of the item down below any price of a like item previously available to the purchaser from the global market.

Finally, the reverse auction process selects the reverse bid containing the lowest price offered for purchase of the item, and informs the purchaser of the same; e.g., displays the lowest reverse bid on a web page viewed by the purchaser. As a result, the reverse auction process produced an opportunity for the purchaser to purchase the item at a price lower than one obtained via an auction method, via a price search method, and via an offer by purchaser.

BRIEF DESCRIPTION OF THE DRAWING

FIG. 1 represents a flow diagram of the method for purchasing goods or services via the Internet according to the present invention.

DETAILED DESCRIPTION OF THE INVENTION

The present invention provides a method and system for location and purchase of an item at an optimal price for the purchaser. The system and method consist of two phases, wherein phase one generates a lowest posted price from a consideration of prices for a requested item, and phase two generates a sale price below the lowest posted price obtained in phase one.

In the following detailed description, like reference numerals are used to refer to various elements of the invention shown in multiple figures thereof. Referring now to the drawings, and particular to FIG. 1, a reverse auction method of the present invention comprising a two-phase process is shown.

Phase One

In phase one, the reverse auction method finds the lowest advertised price of the item (goods or services) to be purchased from a host of sources, thereby advantageously securing the lowest advertised price possible from web sites advertising the requested item at a posted price.

Initially, the purchaser utilizes an input device such as a PC to access a web site associated with the reverse auction. While it is contemplated that the purchaser utilizes the PC to communicate with the reverse auction web site via the Internet, any input device may be used; e.g., WebTV, PDA, telephonic devices, etc. Further, any communication link between the PC and the reverse auction web site will suffice; e.g., analog or digital communication lines, wireless communication paths, or IR. The reverse auction web site includes a server and any combination of hardware and software necessary to carry out the functions described herein.

Once communications are established with the reverse auction web site, the purchaser views one or more web pages associated with the reverse auction process. From one of the web pages, the purchaser enters a request containing a textual description of the item sought 4. Alternatively, the purchaser selects the item from a pull down menu displayed on the web page.

The server associated with the reverse auction web site receives the data pertaining to the requested item, and initiates a search for goods or services matching those set out in the request.

Preferably, the server and its associated software utilize one or more search engines; i.e., a special-purpose software program that uses an algorithm to search an index of topics given a search argument. Generally, the search engine is designed so that its approach to searching the index can be changed to reflect new rules for finding and prioritizing matches in the index. The search engines locate web sites that offer the requested item for sale by utilizing a variety of search criteria. For example, the server might utilize Webcrawler to search for the requested item by name, Lycos to search all web sites advertising discounted merchandise, and Excite! to search electronic bulletin boards containing posted sales advertisements for the requested item.

The search engines traverse the Internet, capture information pertaining to the posted price for the requested item at each web site that advertises the requested item, and forward the information via the Internet to the server.

Once the server receives a predetermined number of posted prices from the various search engines, the server and its associated software determine a lowest posted price from the pool of posted prices. The server displays the lowest posted price 8 on a web page viewed by the purchaser, thus completing phase one of the reverse auction process.

Phase Two

In the second phase of the reverse auction process, the method solicits a starting bid from the purchaser, induces a bidding competition among multiple vendors of the requested item, whereby the competition is seeded with a starting bid from the purchaser. After receiving the starting bid, each vendor submits a sale bid (hereinafter, reverse bid) at a price lower than the starting bid. In this manner, the competition among the vendors to consummate a sale with the purchaser drives the final sale price down below the lowest posted price determined in phase one and below the initial bid for purchase submitted by the purchaser.

To accomplish the foregoing, the purchaser formulates a starting bid for the requested item. The starting bid is derived from the lowest posted price provided to the purchaser in phase one; and, typically, consists of a price equal to or lower than the lowest posted bid.

The purchaser again utilizes the PC to access the reverse auction web site via the Internet, and views a web page containing a text field for the starting bid. The purchaser enters the starting bid, for example, in a text field 10, and the bidding competition begins.

The reverse auction web site server and its associated software contact a vendor audience to solicit bids for sale of the requested item. The vendor audience is formed according to a predetermined plan; e.g., various vendors contact the reverse auction company and list a web server capable of functioning as a reverse auction participant.

Typically, each vendor in the vendor audience has an associated web site. The server establishes communications via the Internet with each web site in the vendor audience, provides the starting bid and requested item data to each web site, polls each web site for a reverse bid, and collects the reverse bids provided by each web site 12.

Upon collection of the reverse bids, the server determines a final bid from the collection, and displays the final bid to the purchaser via a web page. After viewing the final bid, the purchaser either rejects or accepts the final bid 14. If the purchaser rejects the final bid, the purchaser may either seed the bidding competition again by entering a new starting bid 10 or abandon the purchase. If the purchaser accepts the final bid, the reverse auction company facilitates the consummation of the sale via any number of methods, online or other, thus completing phase two.

Having illustrated and described the principles of the invention in a preferred embodiment, it should be apparent to those skilled in the art that the embodiment can be modified in arrangement and detail without departing from such principles. For example, the configuration of computer components may be changed if preferred. Therefore, the illustrated embodiment should be considered only as the preferred example of the invention and not as a limitation on its scope, which is defined by the following claims. We therefore claim as our invention all modifications and equivalents to the embodiment coming within the scope and spirit of these claims.

I claim:

1. A method of purchasing goods and services over the Internet, comprising the steps of:
    obtaining a posted price associated with the goods and services from a first set of multiple vendors over the Internet;
    determining a lowest posted price of the posted prices obtained in the previous step;
    submitting a starting bid over the Internet which is lower than the lowest posted price;
    collecting one or more reverse bids from a second set of multiple vendors over the Internet, wherein each reverse bid represents a price which is lower than the starting bid;
    selecting a final bid from among the reverse bids; and
    purchasing the goods or services using the final bid.

2. The method of claim 1, wherein the step of obtaining a posted price includes conducting a search over the Internet including the use of an existing search engine.

* * * * *